United States Patent
Unterlass et al.

(10) Patent No.: US 11,718,715 B2
(45) Date of Patent: Aug. 8, 2023

(54) PROCESS FOR PREPARING POLYBENZIMIDAZOLES

(71) Applicant: Technische Universitaet Wien, Vienna (AT)

(72) Inventors: Miriam Margarethe Unterlass, Vienna (AT); Michael J. Taublaender, Wiesen (AT); Sophia Thiele, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 629 days.

(21) Appl. No.: 16/649,260

(22) PCT Filed: Sep. 5, 2018

(86) PCT No.: PCT/EP2018/073901
§ 371 (c)(1),
(2) Date: Mar. 20, 2020

(87) PCT Pub. No.: WO2019/057498
PCT Pub. Date: Mar. 28, 2019

(65) Prior Publication Data
US 2020/0291182 A1   Sep. 17, 2020

(30) Foreign Application Priority Data

Sep. 20, 2017 (AT) .................................. A 374/2017

(51) Int. Cl.
*C08G 73/18* (2006.01)
(52) U.S. Cl.
CPC .................... *C08G 73/18* (2013.01)
(58) Field of Classification Search
None
See application file for complete search history.

(56) References Cited

U.S. PATENT DOCUMENTS 9,200,118 B2   12/2015   Kharul et al.

FOREIGN PATENT DOCUMENTS

DE   1943499 A1   3/1971
EP   0095348 A2   11/1983
(Continued)

OTHER PUBLICATIONS

Neuse (Polybenzimidazoles from aromatic bis-o-diamines and dialdehydes, Chemistry and Industry, 1975, pp. 315-316). (Year: 1975).*

(Continued)

*Primary Examiner* — Rachel Kahn
(74) *Attorney, Agent, or Firm* — Faegre Drinker Biddle & Reath LLP

(57) ABSTRACT

The invention relates to a method for preparing polybenzimidazoles of formula (1) or (2) below, wherein n is ≥2:

(1)

(2)

(Continued)

Figure 1:
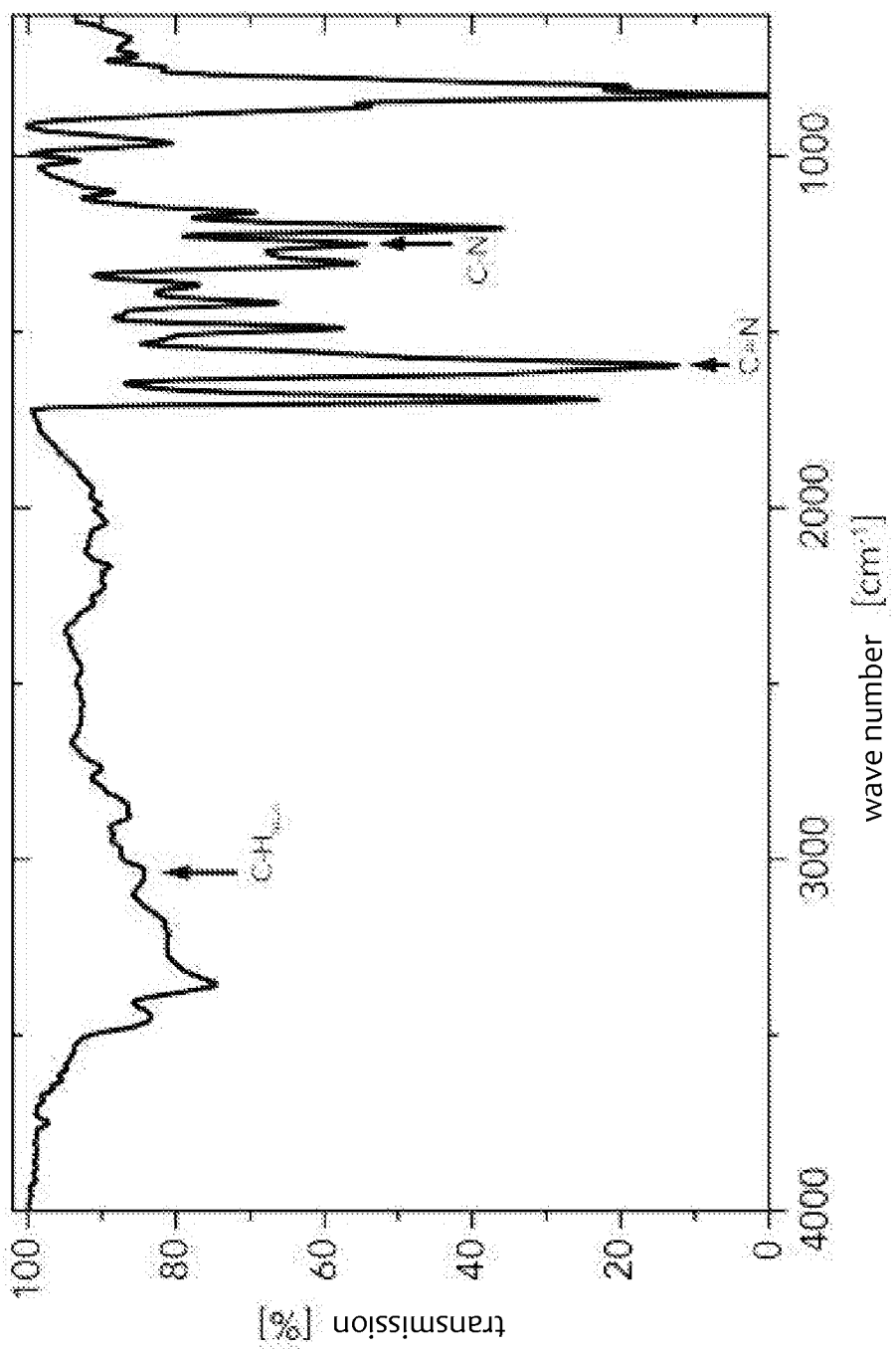

by polycondensation of corresponding dicarboxylic acids or dialdehydes and tetraamines by jointly heating the reactants, characterized in that
the preparation of polybenzimidazoles of formula (1) or (2) is carried out by using the dialdehydes as starting material and substantially without the formation of any intermediates, wherein
  a) first, the dialdehyde and the tetraamine are mixed in water at room temperature, which results in the formation of a polyimine by-product; whereafter
  b) polycondensation is carried out under hydrothermal conditions by heating, in water as a solvent and under pressure, to temperatures above 100° C.

15 Claims, 3 Drawing Sheets

(56) References Cited

FOREIGN PATENT DOCUMENTS

| | | |
|---|---|---|
| EP | 1441015 A1 | 7/2004 |
| WO | 2016179625 A1 | 11/2016 |

OTHER PUBLICATIONS

Dallinger et al (Microwave-Assisted Synthesis in Water as Solvent, Chem. Rev. 2007, 107, 2563-2591). (Year: 2007).*
Simion et al (Synthesis of imines, diimines and macrocyclic diimines as possible ligands, in aqueous solution, J. Chem. Soc., Perkin Trans. 1, 2001, 2071-2078). (Year: 2001).*
International Search Report for PCT/EP2018/073901, dated Dec. 18, 2018, 6 pages.
Written Opinion for PCT/EP2018/073901, dated Dec. 18, 2018, 7 pages.
Austria Search Report for AT A374/2017, dated Aug. 8, 2018, 2 pages.
Neuse et al., "Two-stage polybenzimidazole synthesis via poly(azomethine) intermediates" dated Jan. 1, 1983, 5 pages.
Thies, Turgay Seckin, "Polybenzimidazole Synthesis From Compounds with Sulfonate Ester Linkages", dated Aug. 26, 1987, 102 pages.
Cook, "Synthesis of Polybenzimidazoles Containing Arylene Sulfone and Ether Linkages", dated Feb. 16, 1993, 90 pages.
International Preliminary Report on Patentability for PCT/EP2018/073901, dated Mar. 24, 2020, 8 pages.
Neuse—"Aromatic Polybenzimidazoles, Syntheses, Properties and Applications"; Advances in Polymer Sciences 47, Springer-Vertag Berlin Heidelberg 1982, 42 pages.
Neuse et al.—"Two-Stage Polybenzimidazole Synthesis via Poly(azomethine) Intermediates", Macromolecules, 16, pp. 128-136, 1983.
Nagao et al.—"Rapid production of benzazole derivatives by a high-pressure and high-temperature water microflow chemical process", Green Chemistry, Communication, The Royal Society of Chemistry 2016, 5 pages.
Dudd et al.—"Synthesis of benzimidazoles in high-temperature water"; Green Chemistry, 5, The Royal Society of Chemistry 2003, pp. 187-192 2003.

* cited by examiner

PROCESS FOR PREPARING POLYBENZIMIDAZOLES

PRIOR ART

Aromatic polybenzimidazoles, i.e. polymers having two benzimidazole moieties connected through an aromatic linker, thus forming a conjugated system, are valuable high-performance polymers due to their specific characteristics (high melting point, hardness, pressure resistance, light absorbance), e.g. for use in the fire protection field, for high-temperature membranes in polymer electrolyte fuel cells or in photo-voltaics. They are usually synthesized by polycondensation of aromatic tetraamines, more specifically bis(o-diamines), with aromatic dicarboxylic acids or carboxylic acids of higher valencies—or esters, anhydrides or aldehydes thereof—by heating the reactants to temperatures of more than 100° C. (when using high-boiling solvents) or up to several hundred degrees Celsius (in solid state). When using divalent carboxylic acids or aldehydes, this results in polymers wherein each residue X of the respective carboxylic acid molecule or aldehyde molecule connects two imidazole rings of the polybenzimidazoles, as is shown below.

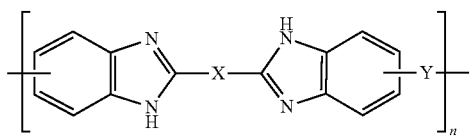

Depending on the choice of tetraamine, the benzene rings of the polybenzimidazoles are connected by a (preferably aromatic) linker Y which may also be a direct chemical bond such as the one obtained when using, e.g., tetraaminobiphenyl (diamino-benzidine, DAB) as tetraamine. The use of tetraaminobenzene constitutes a special case, as both imidazole rings are connected to the same benzene ring, as can be seen below.

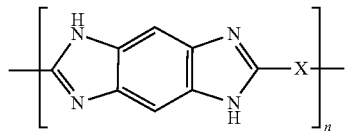

The synthesis of such polymers by use of aromatic dialdehydes is described in detail in an extensive review by Eberhard Neuse (Adv. Polym. Sci. 47, 1-42 (1982)) and, with special reference to diaminobenzidine as tetraamine, in another article of the same author (Neuse and Loonat, Macromolecules 16(1), 128-136 (1983)). According to these articles, mixing of tetraamine and dialdehyde already results in the formation of a polymer described as Schiff base, as is shown below for the case of a reaction of terephthalic acid dialdehyde and diaminobenzidine:

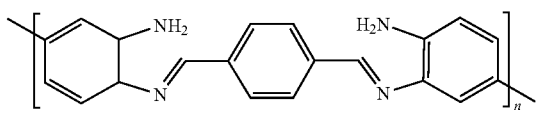

which subsequently is cyclized to obtain the polybenzimidazole. Both articles make explicit reference to the necessity of eliminating oxygen when mixing the reactants as well as the presence of the same in the subsequent cyclization step. Otherwise, i.e. in the presence of $O_2$ in the first polycondensation step, the result could be undesired oxidation reactions, whereas cyclization in absence of $O_2$ is disclosed as "highly inefficient", since it proceeds very slowly.

As can be found in Neuse's review, but also in literature cited therein, such as Vogel and Marvel, J. Polym. Sci. Pol. Chem. 50, 511 (1961), or Iwakura et al., J. Polym. Sci. A 2, 2605 (1964), numerous classical synthesis methods for polybenzimidazoles are known. The two mostly used strategies are: (i) the "Marvel Method", i.e. solvent-free melt polycondensation of an aromatic tetraamine with a diphenyl ester of an aromatic dicarboxylic acid at temperatures of up to 400° C.; and (ii) the "Iwakura Method": solution polycondensation of the hydrochloride of an aromatic tetraamine with a free aromatic dicarboxylic acid in polyphosphoric acid at temperatures of up to 200° C. Both methods require complex equipment, are laborious, not energy-efficient and require a carefully selected heating protocol as well as control of pressure and the absence of air.

There is naturally far more literature on the synthesis of monomeric benzimidazoles, including hydrothermal syntheses, i.e. reactions in water as only or main solvent at temperatures above 100° C., which have become increasingly popular over the past years as they does not require the disposal of often highly toxic solvents. See for example Dudd et al., Green Chem. 5, 187-192 (2003), for the synthesis of 2-phenyl-benzimidazole from diaminobenzene and benzoic acid in water at temperatures of up to 400° C., although temperatures below 350° C. did not result in a yield of more than 50% and yields of more than 90% were only obtained after 14 hours, and Nagao et al., Green Chem. 18, 3494-3498 (2016), for the synthesis of 1,2-diphenylbenzimidazole from 2-aminodiphenylamine and benzoic acid anhydride at temperatures between 400 and 445° C.

However, the use of tetravalent carboxyl or carbonyl compounds, e.g. of tetracarboxylic acids or anhydrides thereof, entails another cyclization step besides the cyclization of the imidazole ring. For example, when using benzene tetracarboxylic acid with tetraamino diphenyl ether, as disclosed by Bell and Pezdirtz, J. Polym. Sci. Pol. Lett. 3(12), 977-984 (1965), the first polycondensation is amidation by reacting an amino functionality each with a carboxylic acid functionality, which yields a so-called poly(amino-acid-amide) or "poly(A-A-A)". Subsequently, the first cyclizations are to take place in the second condensation step: either through attacks on the free amino functionalities of previously amidated carboxyl carbons and simultaneous dehydration in order to form imidazoles fused to benzene rings of the tetraamine while maintaining free carboxyl groups, or through attacks of amide nitrogens on the free carboxyl carbons and simultaneous dehydration in order to form two imide moieties at the aromatic of the tetracarboxylic acid while maintaining free amino groups. The third and last condensation step are cyclizations, forming two 5-membered rings as is shown below. Strictly speaking, the intermediate having free amino groups shown on the right yields another one, i.e. the condensation product mirrored about a horizontal axis, as a polymer does not show free rotability of moieties. Bell and Pezdirtz point to this fact, too ("designation of the positions is arbitrary").

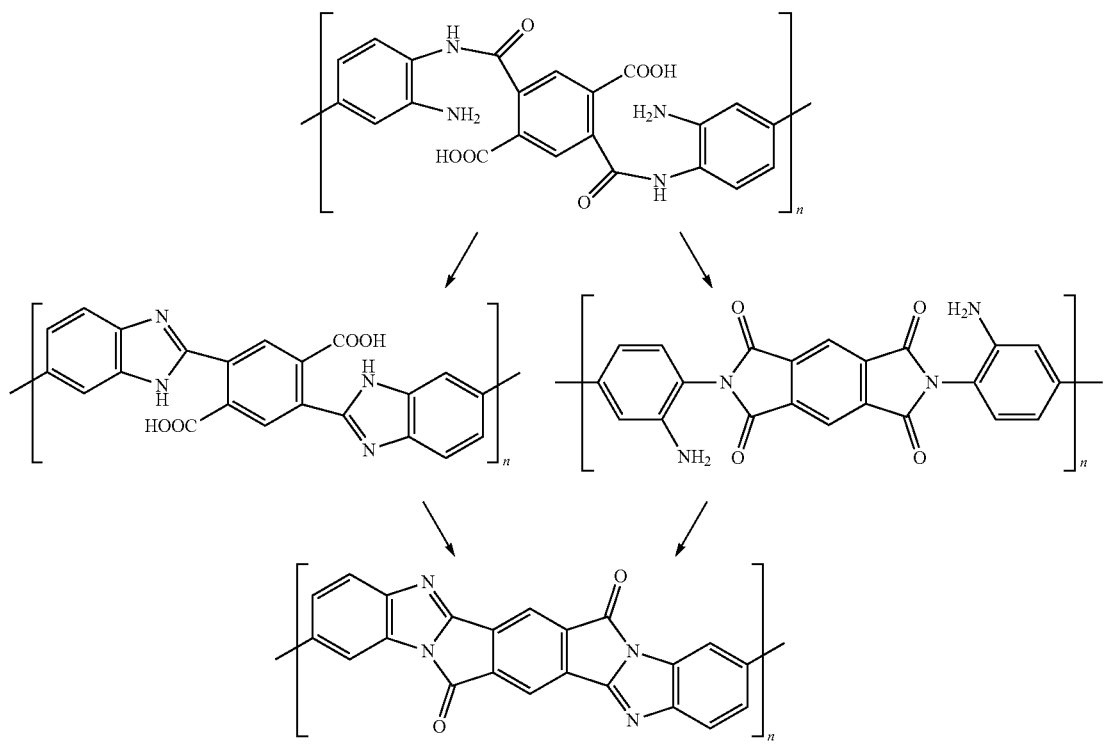

According to Bell and Pezdirtz, the polymeric A-A-A intermediates are isolated and used as a solution for coating surfaces, and it is only after heating to 325° C. that entirely condensed polybenzimidazoles are formed.

In literature, these polybenzimidazoles are also, amongst other names, called polyimidazopyrrolones or, shorter, polypyrrones. See, for example, Dawans and Marvel, J. Polym. Sci., Part A: Polym. Chem. 3, 3549-3571 (1065), Bell and Jewell, J. Polym. Sci., Part A: Polym. Chem. 5, 3043-3060 (1967), and Johnston and Epps, J. Polym. Sci., Part A: Polym. Chem. 10, 2751-2765 (1972), which disclose syntheses starting from pyromellitic dianhydride, either in solid form at temperatures between 200 and 300° C., or as a solution in aprotic high-boiling solvents (e.g. dimethyl acetamide, DMAc).

Interestingly, V. L. Bell, who, in 1965, together with G. F. Pezdirtz had still considered both variants shown above for the formation of intermediates from the initial poly-condensate "poly(A-A-A)" to be possible, disclosed only the right intermediate including free amino groups and cyclic imides, but no free carboxylic acid groups, two years later in Bell and Jewell (1967, supra).

The use of naphthalene tetracarboxylic acid instead of pyromellitic acid yields corresponding polybenzimidazoles having a saturated 6-membered ring. Due to their structural identity with the organic pigment and semiconductor perinone, they have, in recent years, also been called "polyperinones". For synthesis, see for example Van Deusen, J. Polym. Sci. Pol. Lett. 4, 211-214 (1966), and Zhou and Lu, J. Appl. Polym. Sci. 58, 1561-1565 (1995). The latter discloses conducting the reaction in solution in DMAc, during which, initially, only the not cyclized intermediate is produced and isolated, and after subsequent film drawing using a DMAc solution thereof, is cyclized by heating to 300° C. Other authors also describe precipitation and isolation of the intermediate or filtration and centrifugation of its solution before the subsequent cyclization. Van Deusen (supra), however, discloses direct polycondensation resulting in an entirely cyclized polyperinone in polyphosphoric acid at temperatures of up to 220° C., which entails subsequent, often laborious cleaning of the polymers.

Morgan and Scott, J. Appl. Polym. Sci. 16, 2029-2050 (1972), disclose the preparation of stoichiometric mixtures and salts from tetracarboxylic acid and tetraamine, using N2 as protective gas against the access of oxygen, as well as the subsequent polycondensation of the mixtures or salts, respectively, while simultaneously molding the polymer resulting therefrom by heat pressing while heating to temperatures of 450° C. This, however, yields products showing high fluctuations in quality and stability, even though higher stability was observed in nitrogen than in air.

All these polybenzimidazoles with fused 5- or 6-membered ring share the feature of cis- and trans-isomerisms with regards to the free carboxyl or amino groups of the intermediates and thus the carbonyl groups of the entirely condensed polymers, as Bell and Pezdirtz (supra) and Van Deusen (supra) indicate and as the inventors of the present application have confirmed. This will be elaborated further below.

The working group of the inventors has done elaborate research on hydrothermal syntheses for preparing polyimides in the past, see e.g. PCT/AT2016/050140 and PCT/AT2017/000058. More specifically, research has been done relating to polybenzimidazoles having fused 6-membered ring ("polyperinones") mentioned above, see, for example, Michael Taubländer, "Development of Novel Synthetic Routes Towards Polyimides and Poly(perinone)s", Diploma Thesis, Vienna University of Technology, 2017. In the course of this research it has been found that, generally, hydrothermal synthesis starting from naphthalene tetracarboxylic dianhydride (NTCADA) and diaminobenzidine (DAB) allows the preparation of the above-mentioned 6-membered polyperinones. However, the products showed very low molecular weights (determined by means of IR analysis) and the aqueous phases were highy contaminated and had a dark purple colour. This was attributed to a substantial proportion of oxidative polymerization generatof formula (1) or (2) is carried out by using the dialdehydes as starting material and substantially without the formation of any by-products, wherein a) first, the dialdehyde and the tetraamine are mixed in water at room temperature, which results in the formation of a polyimine intermediate of formula (3) or (4), wherein n and m are each ≥1:

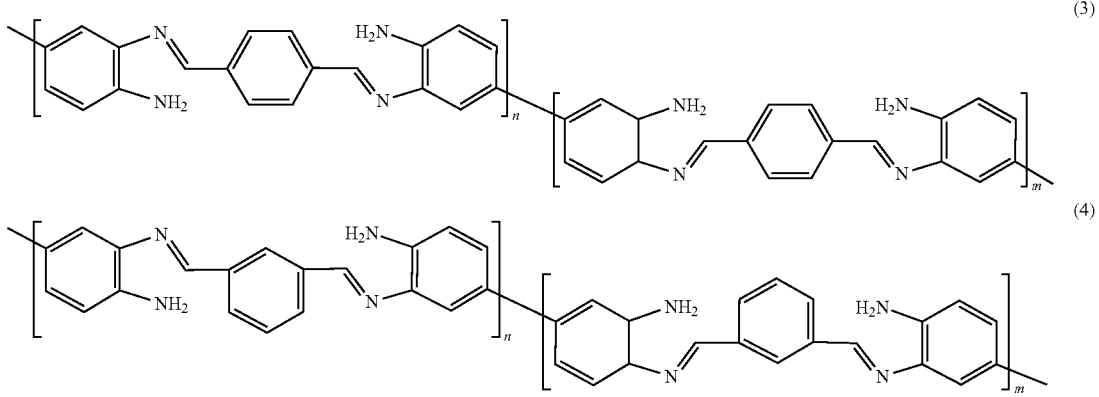

ing various by-products which disturbed stoichiometry and thus prevented the yield of the desired polyperinone with high molecular weight. Furthermore, it proved difficult to separate these by-products from the target polymer, since, upon extraction, both aqueous and ethanolic washing solutions remained deeply coloured, even after many washings.

Against this backdrop, the objective of the present invention was to develop an improved method for preparing polybenzimidazoles, especially the above-mentioned polybenzimidazoles without fused 5- or 6-membered rings, from divalent carboxyl or carbonyl compounds and tetraamines, in order to provide a relatively simple way of obtaining high-molecular polymers, without the formation of large amounts of hard-to-separate by-products.

DISCLOSURE OF THE INVENTION

The present invention meets this objective by providing a method for preparing polybenzimidazoles of formula (1) or (2) below, wherein n is ≥2:

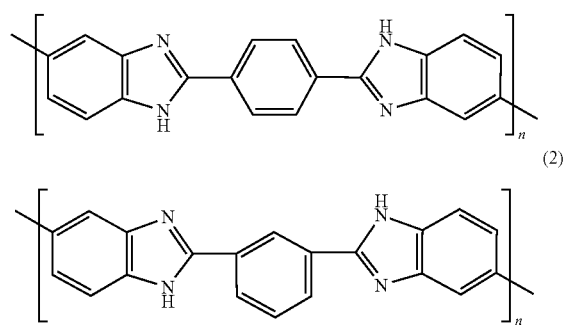

by polycondensation of corresponding dicarboxylic acids or dialdehydes and tetraamines by jointly heating the reactants, characterized in that: the preparation of polybenzimidazoles whereafter b) polycondensation is carried out under hydrothermal conditions by heating, in water as a solvent and under pressure, to temperatures above 100° C.

The inventors surprisingly found that a synthesis of polybenzimidazoles of the formulae (1) and (2) from the corresponding dialdehydes and tetraamines under hydrothermal conditions:

does not require cooling or the elimination of oxygen while mixing the reactants;

can be completed within short reaction times and at relatively low temperatures;

generates no by-products at all; and does not require the presence of oxygen; wherein the latter was especially surprising, given the disclosures by Neuse (supra).

In preferred embodiments of the invention, a polybenzimidazole of formula (1) is prepared according to the reaction scheme below, wherein, in step a), terephthalic acid dialdehyde (TDA) and diaminobenzidine (DAB) are mixed in water and, in step b), they are polycondensed under hydrothermal conditions to form the polybenzimidazole of formula (1):

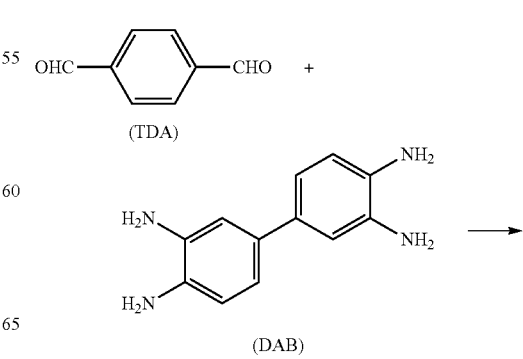

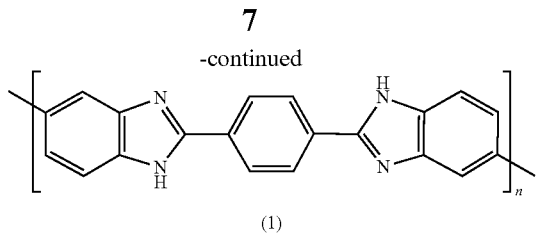

(1)

In alternative preferred embodiments, a polybenzimidazole of formula (2) is prepared according to the reaction scheme below, wherein, in step a), isophthalic acid dialdehyde (IDA) and diaminobenzidine (DAB) are mixed in water and, in step b), they are polycondensed under hydrothermal conditions to form the polybenzimidazole of formula (2):

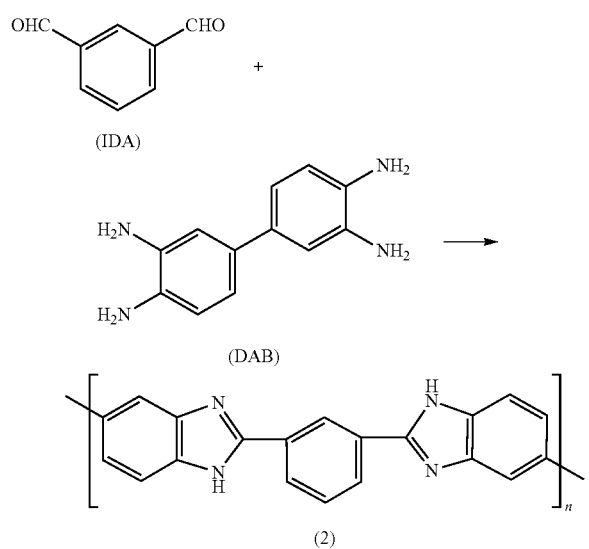

In both cases, mixing of the reactants at room temperature may be carried out without the use of an inert gas, which represents in a significantly simplified reaction in comparison with the procedures described in Neuse (supra). Furthermore, the polycondensation step does not require the presence of oxygen, which is demonstrated clearly in Example 5 where the reaction mixture was degassed with argon before heating to hydrothermal conditions, but still reacted to give the desired polybenzimidazole in an identical way within a relatively short period of time.

Polycondensation in step b) is preferably carried out at a temperature of at least 180° C. and for a duration of at least 30 min, more preferably at least 2 h or, as is most preferred according to the present invention, at a temperature of at least 250° C. and for a duration of at least 30 min, in order to shorten reaction time.

The present invention is herein described and illustrated by means of examples using unsubstituted reactants. Nevertheless, it is clear to a person skilled in the art that both the dialdehyde and the tetraamine may be substituted in a conventional manner without departing from the spirit of the invention, as long as the nature and position of the substituents do not interfere with or even take part in the polycondensation reactions, i.e. chain propagation, and the cyclization condensation reactions, which, for example, might occur in the case of bulky substituents or amino, carbonyl or carboxyl substituents. For example, instead of phthalic acid dialdehydes, another corresponding aromatic dialdehyde (e.g. naphthalene dicarbaldehyde) or a corresponding aliphatic dialdehyde may be used, as long as the positions of both formyl groups allow for corresponding polycondensation, i.e. as long as not both of them can react with two vicinal amino groups of the tetraamine to form a diamide. The same holds true in an analogous manner for the tetraamine, so that, for example, tetraamino benzophenone, tetraamino naphthalene, tetraamino diphenyl ether or similar tetraamines may be used instead of diaminobenzidine. Therefore, for example, substitutable hydrogen atoms at any positions of the aromatic ring systems may be substituted by non-interfering substituents such as halogen, lower alkyl or lower alkoxy, but also by any other groups disclosed in literature as non-interfering with such condensations.

SHORT DESCRIPTION OF THE DRAWINGS

Figure 2:
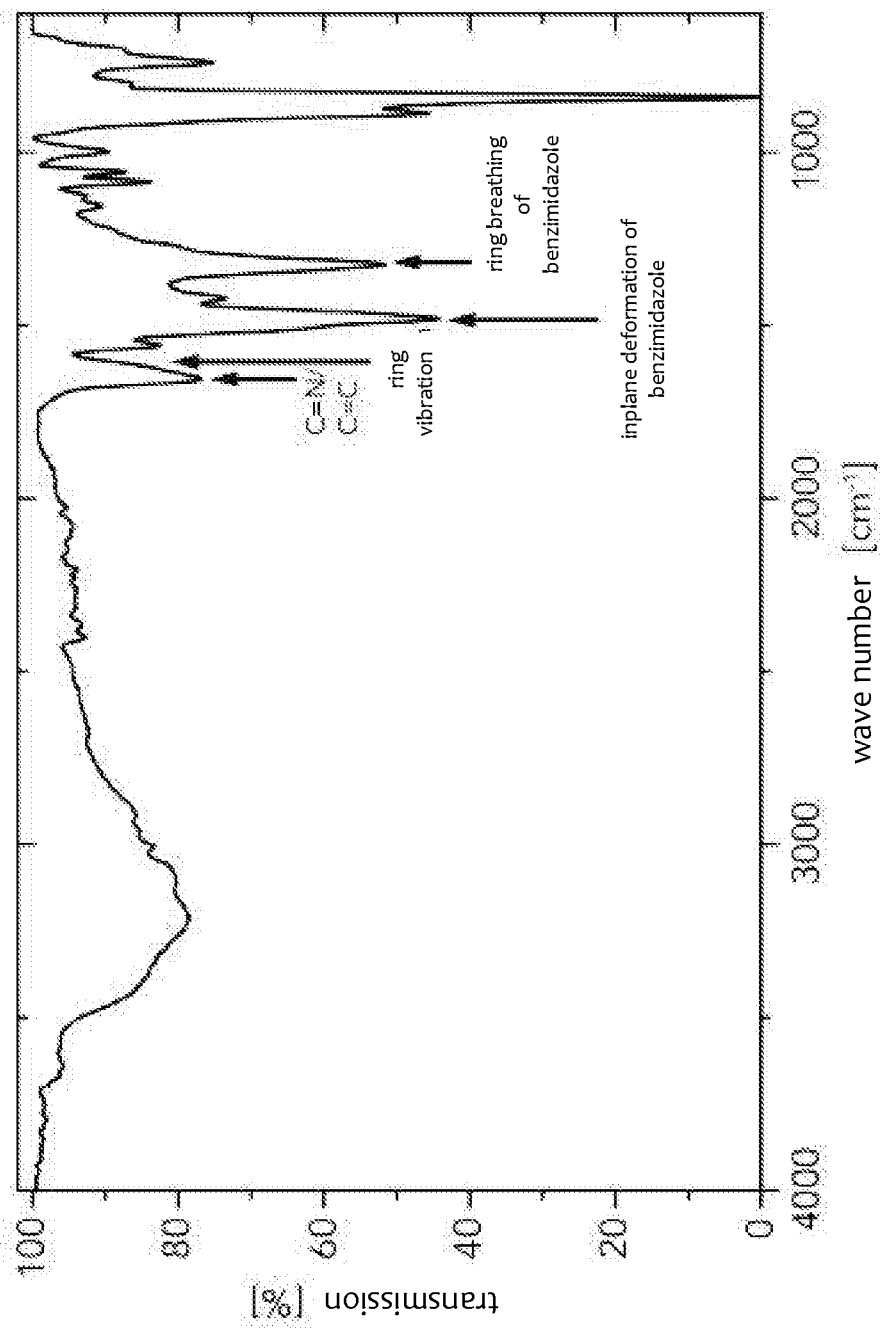
Figure 3:
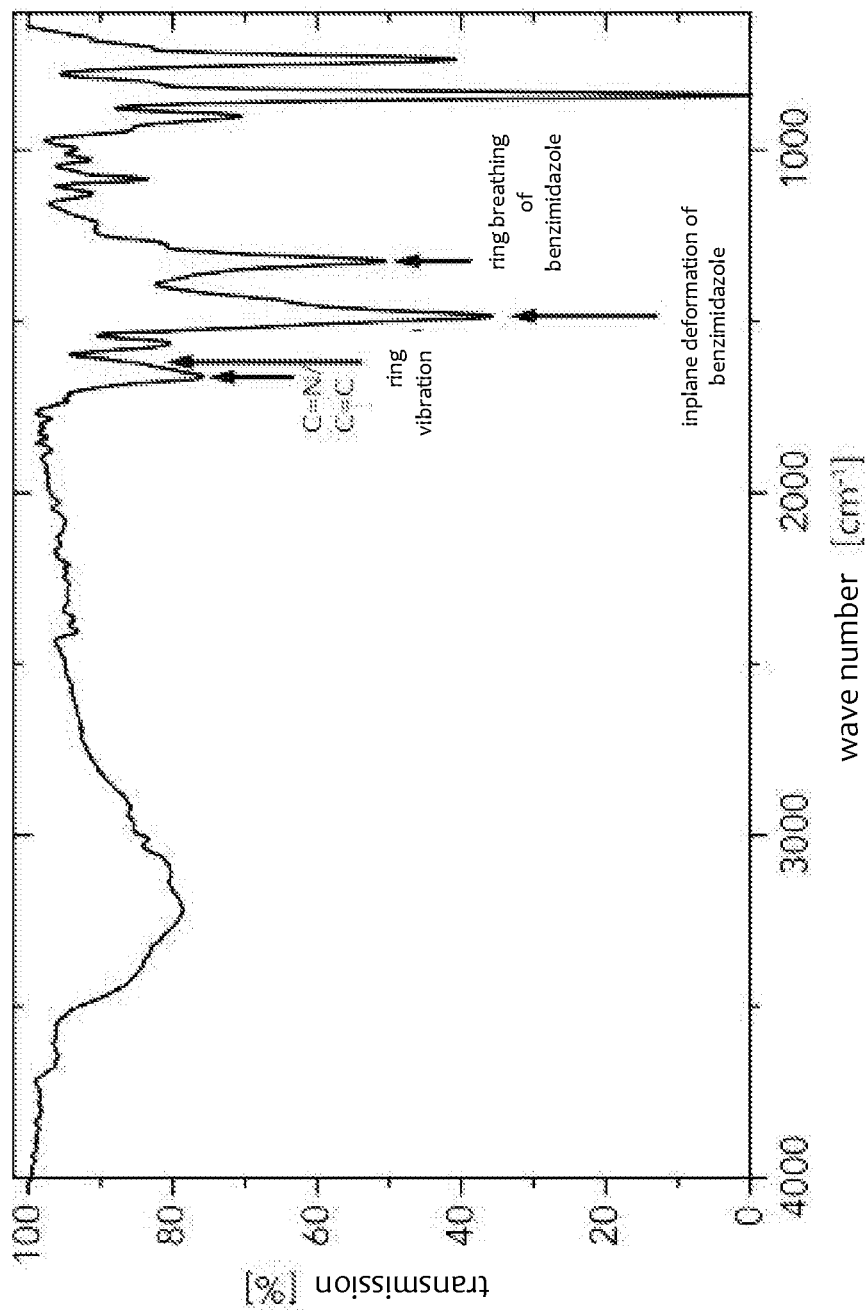

In the following, the present invention will be described in more detail by means of non-limiting examples and with reference to the appended drawings, wherein FIG. 1 illustrates the FTIR-ATR spectrum of the polyimine intermediate obtained in Example 1;

FIG. 2 illustrates the FTIR-ATR spectrum of the polybenzimidazole obtained in Example 1; and FIG. 3 illustrates the FTIR-ATR spectrum of the polybenzimidazole obtained in Example 5.

EXAMPLES

Example 1

Preparation of a polybenzimidazole of formula (1) at 250° C.

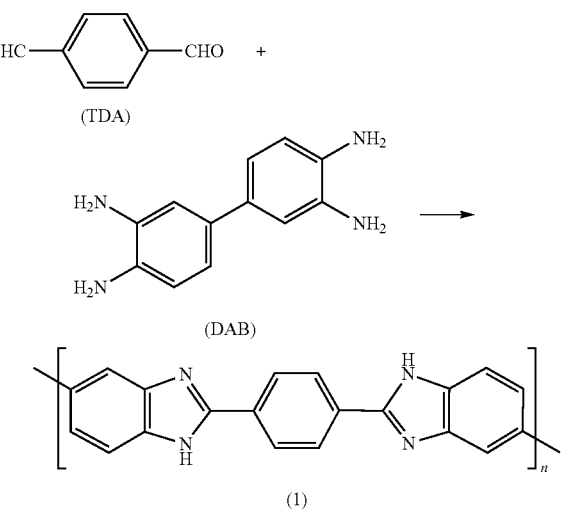

In a glass liner, 64 mg of terephthalic dialdehyde (TDA) (0.48 mmol, 1 eq.) were suspended in 40 ml of distilled $H_2O$ while stirring at room temperature. 103 mg of 3,3'-diaminobenzidine DAB (0.48 mmol, 1 eq.) were added and stirred for another 10 min at room temperature, yielding a red solid. The obtained red suspension was used directly, without isolating the solid, for hydrothermal synthesis. In order to characterize this intermediate product, in a separate batch, the solid was filtered off, washed, dried and analyzed by IR spectroscopy. The FTIR-ATR spectrum is shown in FIG. 1 and resulted in the identification of the red solid as a polyimine intermediate similar to that described in the introductory section. Actually, it corresponds to the following formula (3):

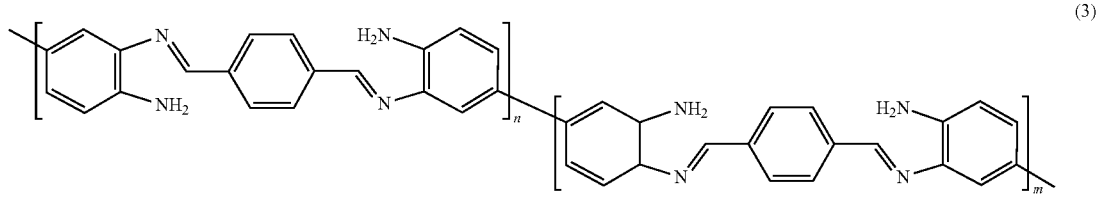

Similar to the polybenzimidazoles having a fused 5- or 6-membered ring that were mentioned in the introduction, the polyimine intermediates of formula (3)—and those of formula (4)—show cis- and trans-isomerisms with regard to the free amino groups due to the limited rotability of the conjugated, and thus planar, molecules. The latter may therefore point in opposing directions or in the same direction, as is illustrated in formulae (3) and (4) herein by the different moieties which are present n times or m times, respectively. Strictly speaking, there is a third alternative of the moieties in which both amino groups do not point up, but down. For the sake of clarity, this description refrains from an explicit illustration of this alternative. The proportion between these moieties cannot be determined explicitly and, due to their identical chemical characteristics, is not essential for the further course of the hydrothermal condensation, which removes the isomerism. Therefore, the latter does not affect the characteristics of the polybenzimidazoles obtained, which is why this will not be elaborated further herein.

The characteristic bands of this polyimine are: $v(C-H_{Imin})=2875$ cm$^{-1}$, $v(C=N)=1595$ cm$^{-1}$ and $v(C-N)=1205$ cm$^{-1}$.

For hydrothermal polymerization giving the desired polybenzimidazole, the previously obtained red suspension was transferred into a microwave autoclave (120 ml). Next, the reaction mixture was heated at 250° C. within 15 min under stirring, which temperature was maintained for another 15 min. The reaction vessel was then cooled down within 30 min by means of a stream of pressurized air. The orange suspension obtained after opening the autoclave was filtrated, and a clear liquid was obtained in addition to an orange solid. The solid formed was thoroughly washed with distilled H$_2$O and then EtOH and dried at 80° C. in a vacuum drying oven. The FTIR-ATR spectrum is shown in FIG. 2 and confirms that this is the desired polybenzimidazole. The bands characteristic for polybenzimidazoles are: $v(C=N/C=C)=1615$ cm$^{-1}$, $v$(ring vibration)$=1585$ cm$^{-1}$ (characteristic for conjugation between benzene and imidazole ring), $v$(benzimidazole; "in plane" deformation vibration)$=1445$ cm$^{-1}$ and $v$(benzimidazole, ring breathing)$=1285$ cm$^{-1}$.

Extraction of samples of the polybenzimidazole of formula (1) using various organic solvents (MeOH, EtOH, iPrOH, phenol, PE, EE, CDCl$_2$, CDCl$_3$, acetone, acetonitrile) each yielded clear filtrates, not containing any impurities. Closer examination of the aqueous phase after hydrothermal polymerization showed that it did not contain any by-products of the hydrothermal polymerization, either.

Example 2

Preparation of a polybenzimidazole of formula (1) at 180° C.

The reaction was substantially the same as in Example 1, with the exception that the reaction mixture in the autoclave was heated at only 180° C. within 10 min, but maintained at this temperature for 2 h, and that cooling by means of a stream of pressurized air took 20 min. Again, in addition to a clear aqueous phase, an orange solid was obtained, the FTIR-ATR spectrum of which was substantially identical to the one shown in FIG. 2.

Again, extraction attempts of the polybenzimidazole of formula (1) and examinations of the aqueous phase after hydrothermal polymerization did not yield any results.

Example 3

Preparation of a polybenzimidazole of formula (1) at 180° C. without stirring

The reaction was substantially the same as in Example 2, with the exception that the red suspension formed by mixing the reactants was transferred into a non-stirring batch autoclave which was positioned into an oven preheated at 180° C., where the reaction mixture was left to react for 4 h. Next, the autoclave was cooled off by quenching with cold tap water. Again, a clear aqueous phase and an orange solid were obtained, the FTIR-ATR spectrum of which was substantially identical to the one shown in FIG. 2.

Again, extraction attempts of the polybenzimidazole of formula (1) and examinations of the aqueous phase after hydrothermal polymerization did not yield any results.

Example 4

Preparation of a polybenzimidazole of formula (1) at 250° C. in argon

Initially, the reactive process was substantially the same as in Example 1, although the reaction mixture was degassed by bubbling through argon before heating in order to remove oxygen both from the aqueous phase and from the head space above it. Then, it was heated at 250° C. within 60 min and maintained at this temperature for another 60 min (total reaction time: 2 h). Subsequent cooling of the reactor was not carried out by a stream of pressurized air, but by quenching with cold tap water. Again, in addition to a clear aqueous phase, an orange solid was obtained, the FTIR-ATR spectrum of which was also substantially identical to the one in FIG. 2, which shows that—as opposed to the teachings of the state of the art—the presence of oxygen is not required for completing cyclizing condensation of the polyimine intermediate to give the desired polybenzimidazole under hydrothermal conditions in a relatively short time.

Once more, extraction attempts of the polybenzimidazole of formula (1) and examinations of the aqueous phase after hydrothermal polymerization did not yield any results.

Example 5

Preparation of a polybenzimidazole of formula (2) at 250° C.

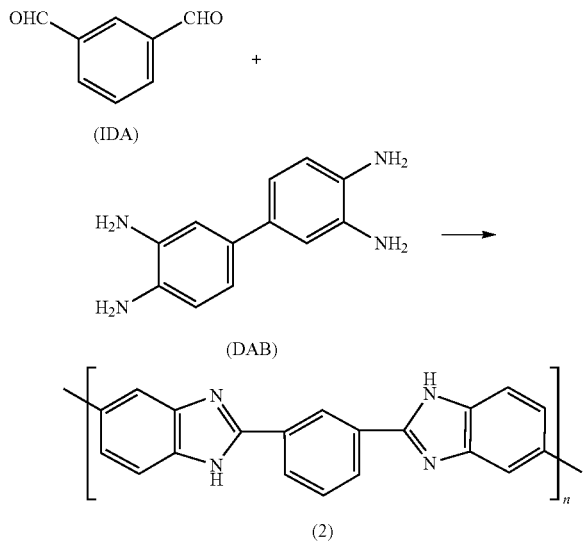

The reactive process was substantially the same as in Example 1, although, instead of TDA, the same amount of isophthalic acid dianhydride (IDA) was used. Again, in addition to a clear aqueous phase, an orange solid was obtained (and cleaned in the same way), the FTIR-ATR spectrum of which is shown in FIG. 3. Using the latter, the solid was identified as the desired polybenzimidazole of formula (2). The characteristic bands are: $v(C=N/C=C)=1625$ cm$^{-1}$, $v$(ring vibration)=1585 cm$^{-1}$, $v$(benzimidazole; "in plane" deformation vibration)=1440 cm$^{-1}$ and $v$(benzimidazole, ring breathing)=1285 cm$^{-1}$.

Extraction attempts of the polybenzimidazole of formula (2) analogous to those for the one of formula (1) and examinations of the aqueous phase after hydrothermal polymerization did not yield any results; thus, no by-products were formed in this case, either.

The invention claimed is:

1. A method for preparing polybenzimidazoles of formula (1) or (2) below, wherein n is ≥2:

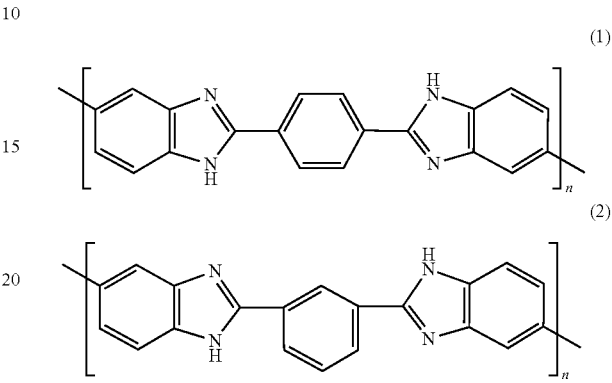

by polycondensation of corresponding dialdehydes and tetraamines,
characterized in that
a) first, the dialdehyde and the tetraamine are mixed in water at room temperature, which results in the formation of a polyimine intermediate of formula (3) or (4), wherein p and m are each ≥1:

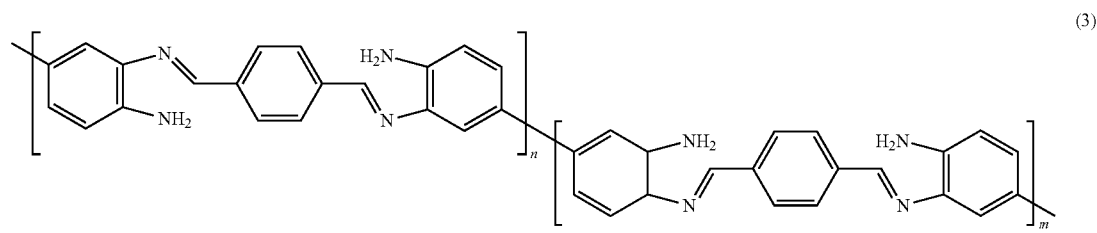

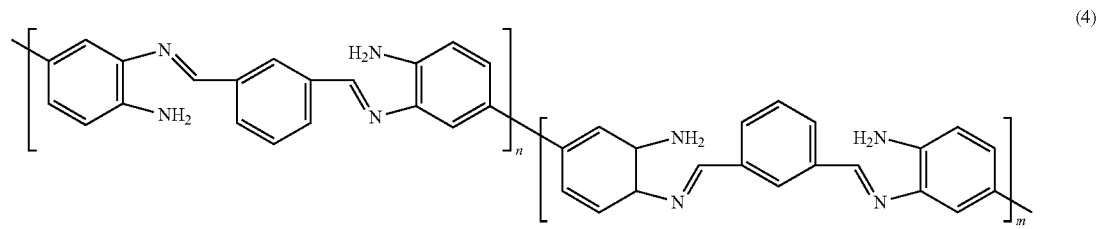

whereafter
b) polycondensation is carried out under hydrothermal conditions by heating, in water as a solvent and under elevated pressure, to temperatures above 100° C.

2. The method according to claim 1, characterized in that a polybenzimidazole of formula (1) is prepared according to the reaction scheme below, wherein, in step a), terephthalic acid dialdehyde (TDA) and diaminobenzidine (DAB) are mixed in water and, in step b), they are polycondensed under hydrothermal conditions to form the polybenzimidazole of formula (1):

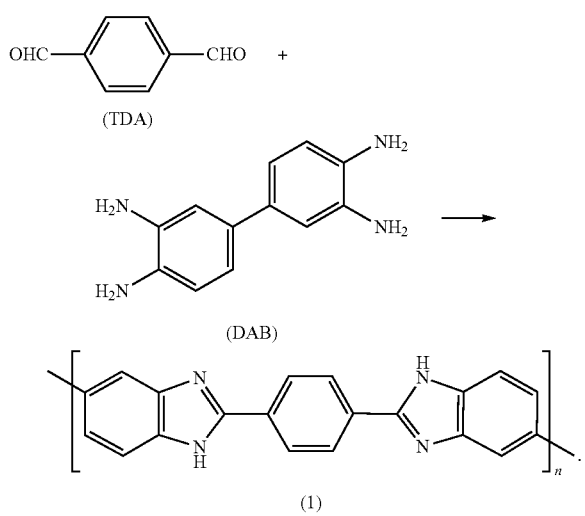

(1)

3. The method according to claim 1, characterized in that a polybenzimidazole of formula (2) is prepared according to the reaction scheme below, wherein, in step a), isophthalic acid dialdehyde (IDA) and diaminobenzidine (DAB) are mixed in water and, in step b), they are polycondensed under hydrothermal conditions to form the polybenzimidazole of formula (2):

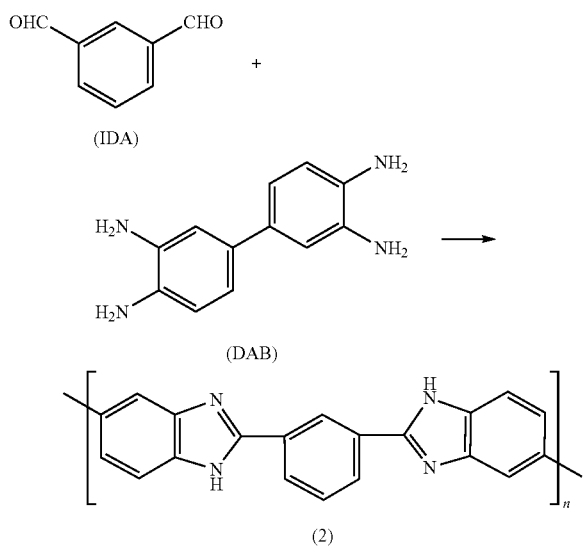

(2)

4. The method according to claim 1, characterized in that the polycondensation in step b) is carried out at a temperature of at least 180° C. and for a duration of at least 30 min.

5. The method according to claim 4, characterized in that the polycondensation in step b) is carried out at a temperature of at least 180° C. and for a duration of at least 2 h.

6. The method according to claim 4, characterized in that the polycondensation in step b) is carried out at a temperature of at least 250° C. and for a duration of at least 30 min.

7. The method according to claim 1, characterized in that step a) is carried out in the presence of atmospheric oxygen and/or step b) is carried out in the absence of atmospheric oxygen.

8. The method according to claim 2, characterized in that the polycondensation in step b) is carried out at a temperature of at least 180° C. and for a duration of at least 30 min.

9. The method according to claim 8, characterized in that the polycondensation in step b) is carried out at a temperature of at least 180° C. and for a duration of at least 2 h.

10. The method according to claim 8, characterized in that the polycondensation in step b) is carried out at a temperature of at least 250° C. and for a duration of at least 30 min.

11. The method according to claim 8, characterized in that step a) is carried out in the presence of atmospheric oxygen and/or step b) is carried out in the absence of atmospheric oxygen.

12. The method according to claim 3, characterized in that the polycondensation in step b) is carried out at a temperature of at least 180° C. and for a duration of at least 30 min.

13. The method according to claim 12, characterized in that the polycondensation in step b) is carried out at a temperature of at least 180° C. and for a duration of at least 2 h.

14. The method according to claim 12, characterized in that the polycondensation in step b) is carried out at a temperature of at least 250° C. and for a duration of at least 30 min.

15. The method according to claim 12, characterized in that step a) is carried out in the presence of atmospheric oxygen and/or step b) is carried out in the absence of atmospheric oxygen.

* * * * *